(12) United States Patent
Miller et al.

(10) Patent No.: US 6,903,136 B2
(45) Date of Patent: Jun. 7, 2005

(54) FOOD SUPPLEMENTS CONTAINING 4-HYDROXYISOLEUCINE AND CREATINE

(75) Inventors: Peter J. Miller, Port Jefferson Station, NY (US); Christine Steele, Lakewood, CO (US); Kevin Kerr, Lakewood, CO (US)

(73) Assignee: Experimental and Applied Sciences, Inc., Golden, CO (US)

(*) Notice: Subject to any disclaimer, the term of this patent is extended or adjusted under 35 U.S.C. 154(b) by 37 days.

(21) Appl. No.: 10/420,523

(22) Filed: Apr. 22, 2003

(65) Prior Publication Data

US 2003/0224062 A1 Dec. 4, 2003

Related U.S. Application Data

(60) Provisional application No. 60/374,978, filed on Apr. 22, 2002.

(51) Int. Cl.$^7$ .................... A61K 31/205; A61K 31/195; A61K 33/26; A61K 33/24; A61K 35/78
(52) U.S. Cl. .................... 514/556; 514/561; 514/563; 514/565; 424/646; 424/655; 424/725
(58) Field of Search ................................ 514/556, 561, 514/563, 565; 424/646, 655, 725

(56) References Cited

U.S. PATENT DOCUMENTS

| | | | | |
|---|---|---|---|---|
| 5,470,879 A | * | 11/1995 | Sauvaire et al. | 514/561 |
| 5,968,900 A | * | 10/1999 | Greenhaff et al. | 514/3 |
| 6,075,031 A | * | 6/2000 | Kaddurah-Daouk et al. | 414/275 |
| 6,277,842 B1 | * | 8/2001 | Carthron | 514/188 |
| 6,426,361 B2 | * | 7/2002 | Harris et al. | 514/400 |
| 6,541,026 B2 | * | 4/2003 | Siskind | 424/999 |
| 2001/0031744 A1 | * | 10/2001 | Kosbab | 514/54 |
| 2002/0006907 A1 | * | 1/2002 | Gardiner et al. | 514/18 |

FOREIGN PATENT DOCUMENTS

| WO | WO 97/32577 | * | 9/1997 |
|---|---|---|---|
| WO | WO 01/72688 | * | 10/2001 |

OTHER PUBLICATIONS

Fowden et al., Phytochemistry, 12(7), 1707–11 (1973) Abstract Only.*
Yves Sauvaire et al., "4–Hydroxyisoleucine A Novel Amino Acid Potentiator of Insulin Secretion", Diabetes, vol. 47, Feb. 1998, pp. 206–210.*
Qian Wang et al., "A Practical Systhesis of (2S,3R, 4S)–4–Hydroxyisoleucine, A Potent Insulinotropic α–Amino Acid from Fenugreek", Eur. J. Org. Chem., 2002, pp. 834–839.*
Christophe Broca et al., "4–Hydroxyisoleucine: Effects of Synthetic and Natural Analogues on Insulin Secretion ", European Journal of Pharmacology, vol. 390, 2000, pp. 339–345.*
Christophe Broca et al., "4–Hydroxyisoleucine: Experimental Evidence of its Insulinotropic and Antidiabetic Properties", The American Physiological Society, 1999, pp. E617–623.*
R.D. Sharma et al., "Hypolipidaemic Effect of Fenugreek Seeds: a Chronic Study in Non–insulin Dependent Diabetic Patients", Phytotherapy Research, vol. 10, 1996, pp. 332–334.*
R.D. Sharma et al., "Effect of Fenugreek Seeds on Blood Glucose and Serum Lipids in Type I Diabetes", European Journal of Clinical Nutrition, vol. 44, Apr. 1990, pp. 301–306.*
Solomon Genet et al., "Effects of Vanadate, Insulin and Fenugreek (Trigonella Foenum Graecum) on Creatine Kinase Levels in Tissues of Diabetic Rat", Indian Journal of Experimental Biology, vol. 37, Feb. 1999, pp. 200–202.*
http://www.pro–soma.com/usainfo/news.htm, "Pro–Soma Newsletter: Sep. 2001", downloaded Apr. 18, 2003, 6 pages.
http://www.beefcakenutrition.com/biocreatol–xs–bsnbody-building–supplements.html, "Bicreatol XS 1.76 lbs by BSN", downloaded Apr. 10, 2003, 2 pages.
http://www.b–fit.com/vpnplasex.html, "VPX Plasma Expandor", downloaded Apr. 10, 2003, 3 pages.
http://www.kaizennutrition.com/creatines/creatine_trans.html, "Creatine Transport", downloaded Apr. 10, 2003, 3 pages.
http://www.cdnf.com/item3450.htm, "Creabolic XP 1kg", downloaded Apr. 10, 2003, 2 pages.
http://www.discount–body–building–supplements.com/vpxcreaject.html, "VPX Creaject", downloaded Apr. 10, 2003, 3 pages.
http://www.vpxsports.com/creaject.html, "VPX Enhanced Creatine—Creaject", downloaded Apr. 10, 2003, 2 pages.
http://www.drugstore.com/qxp81009_332828_idif/body-onics_pinnacle/juiced_creatine_wi . . . , "Drugstore-.com—Bodyonics Pinnacle Juiced Creatine with MyoZap/CSP3, Citrus", downloaded Apr. 16, 2003, 4 pages.
http://www.pinnaclejuicedprotein.com/sugarease.html, "Pinnacle SugarEase with Banabalean—Free Shipping", downloaded Apr. 16, 2003, 2 pages.

(Continued)

Primary Examiner—Raymond J. Henley, III
(74) Attorney, Agent, or Firm—Faegre & Benson LLP

(57) ABSTRACT

The present invention provides a dietary or food supplement for healthy humans that includes a combination of 4-hydroxyisoleucine and creatine, or nutraceutically acceptable derivatives of these two compounds. The supplement may include additives such as carbohydrates or amino acids. The invention further includes a regimen for supplementing a healthy athlete's diet by administering on a regular basis to the athlete 4-hydroxyisoleucine and creatine, or nutraceutically acceptable derivatives of these two compounds. The invention also provides a method for enhancing the body's absorption and utilization of a nutrient, comprising administering 4-hydroxyisoleucine or a nutraceutically acceptable derivative thereof in combination with the nutrient.

28 Claims, No Drawings

OTHER PUBLICATIONS http://www.smithadvertising.net/ici003/sp1.htm, "Integrity Nutraceuticals International", downloaded Apr. 16, 2003, 2 pages.

http://www.tsiinc.com/products/ingredients.phtml?id=90, "TSI, Inc.", downloaded Apr. 16, 2003, 1 page.

http://www.tsiinc.com/products/brand.phtml?id=19, "TSI, Inc.", downloaded Apr. 16, 2003, 2 pages.

http://www.tsiinc.com/company/manufacturing.phtml, "TSI, Inc.", downloaded Apr. 16, 2003, 3 pages.

http://www.exoticnatural.com/contact.htm, "Specification of Herbs and Extracts from Exotic Naturals, India", downloaded Apr. 16, 2003, 1 page.

http://www.exoticnatural.com/index.htm, "Exotic Naturals–Natural Products for Health, Cosmetic and Agriculture from India–Sup . . . ", downloaded Apr. 16, 2003, 2 pages.

http://www.exoticnatural.com/extracts.htmStandardised herb extracts, oils, oleoresins, phytochemicals, gums, cosmetic from India, downloaded Apr. 16, 2003, 4 pages.

http://www.exoticnatural.com/trigonellafoenum.htm, "Specification of Herbs and Extracts from Exotic Naturals, India", downloaded Apr. 16, 2003, 3 pages.

http://www.prosourceonline.com/store/fullprod.asp?ProductCode=EAS072, "Prosource Order Products", downloaded Apr. 10, 2003, 2 pages.

http://musclenut.com/thestore/prods/easphxt.html, "Eas-Phosphagen XT 18 Servings—New Products", downloaded Apr. 10, 2003, 2 pages.

Marc Rolland et al., "Full Sterochemical Understanding in a New (2R,3R,4R)–4–Hydroxyisoleucine Synthesis", Acta cryst., C57, 2001, 1415–1417.

Tarek Kassem et al., "Two Kep Chiral Intermediates in a New 4–Hydroxyisoleucine Synthesis", Acta Cryst., C56, 2000, 1037–1039.

\* cited by examiner

FOOD SUPPLEMENTS CONTAINING 4-HYDROXYISOLEUCINE AND CREATINE

REFERENCE TO RELATED APPLICATION

This application claims the benefit of U.S. Provisional Application No. 60/374,978 filed Apr. 22, 2002 and entitled "Food Supplements Containing 4-Hydroxyisoleucine and Creatine," the disclosure of which is hereby incorporated by reference in its entirety.

TECHNICAL FIELD

The present invention relates to a dietary or food supplement for healthy humans that is a combination of 4-hydroxyisoleucine and creatine, or nutraceutically acceptable derivatives of these two compounds. This invention also includes a regimen for supplementing a healthy athlete's diet by administering the supplement to the athlete. The invention further includes a regimen for supplementing a healthy athlete's diet by administering daily to the athlete 4-hydroxyisoleucine and creatine, or nutraceutically acceptable derivatives of these two compounds.

Dietary or food supplements are typically designed to compensate for insufficient or reduced levels of nutrients in the modern human diet. One particular goal in supplementing a diet is to increase or enhance the function of tissues such as muscle tissue. For example, in the sporting and athletic community, food supplements which specifically improve athletic ability are increasingly important, such as supplements that promote or enhance physical growth or endurance, or reduce recovery time after exertion.

Creatine (also known by the names N-methyl-N-guanyl glycine, ($\alpha$-methyl guanido) acetic acid, N-(aminoiminomethyl)-N-glycine, or methylglycocyamine), is a compound derived from amino acids. Creatine is produced naturally in the body, and is found in large amounts in skeletal muscle. Creatine is formed in the liver and taken up into tissues, such as muscle, by means of an active transport system. Creatine synthesis in the body may be augmented by the ingestion of creatine present in meat or other components of a diet.

Creatine is converted into phosphocreatine (also known as phosphorylcreatine or creatine phosphate) in energy-generating biochemical pathways within cells. Phosphocreatine is thought to react with adenosine diphosphate (ADP) to generate adenosine triphosphate (ATP), leaving creatine as a byproduct.

Creatine has been used for some time in ingestible nutritional supplements to enhance cellular creatine levels. Supplements containing creatine are commonly recommended in order to enhance muscle size, strength and even cell volume. It is thought that an increased quantity of intracellular creatine can lead to enhanced muscle performance, muscle growth, and quickened recovery following exercise or exertion. In part, the effects that are related to enhanced cellular creatine levels are due to the availability of extra energy during periods of anaerobic exertion, such as during weight training exercises.

Creatine is often introduced to the blood plasma by oral ingestion and absorption through the digestive tract. The transport of creatine from the blood plasma into muscle cells is aided or enhanced by insulin. U.S. Pat. No. 5,968,900 to Greenhaff, et al., reports methods for increasing creatine retention by causing an increase in blood plasma creatine concentration (such as by oral ingestion of creatine) and simultaneous increase in blood plasma insulin concentration. In some reported embodiments, an increase in blood plasma insulin concentration is caused by ingestion of a simple carbohydrate such as glucose. The above-mentioned patent further reports compositions comprising creatine and carbohydrates.

U.S. Pat. No. 6,277,842 to Carthron reports methods for promoting weight and fat loss comprising coadministration of creatine, L-carnitine, chromium picolinate, $\alpha$-lipoic acid, niacin, pyruvate, riboflavin, thiamine, and coenzyme Q10.

U.S. Pat. No. 6,426,361 to Harris, et al. reports compositions and dietary supplements comprising creatine and the amino acid $\beta$-alanine or an active derivative. The compositions and supplements are reportedly useful for increasing the anaerobic working capacity of muscles and other tissue.

U.S. Published Application 2002/0006907 (Ser. No. 09/775,431) of Gardiner, et al. reports food supplements for increasing lean muscle mass or muscle strength, comprising $\alpha$-lipoic acid and an amino acid such as glutamine. In some embodiments, the supplements further comprise creatine.

The use of creatine compounds, such as cyclocreatine or creatine phosphate, for treating or preventing metabolic disorders such as hyperglycemia, insulin-dependent diabetes, and others is reported in U.S. Pat. No. 6,075,031 to Kaddurah-Daouk, et al. The reported methods include administering to a subject a creatine compound to regulate the subject's glucose level.

Fenugreek (*Trigonella foenum graecum* L.; also known as "methi") has also drawn interest as a hypoglycemic agent, and its effect on blood glucose and serum lipids for insulin-dependent diabetic patients has been documented; see Sharma, et al., *Eur. J. Clin. Nutr.* 44, 301 (1990), and Sharma, et al., *Phytother. Res.* 10, 332 (1996). Genet, et al. (*Indian J. Exper. Biol.* 37, 200 (1999)) studied the in vivo effects of fenugreek on the activity of creatine kinase, an enzyme that catalyzes the phosphorylation of ADP by phosphocreatine to form ADP. The researchers reported that, for diabetic rats, supplementing the diet with fenugreek powder was moderately effective in restoring creatine kinase activity to near-normal levels.

4-Hydroxyisoleucine (4OH-Ile) is an amino acid that occurs naturally in fenugreek seeds, but does not occur naturally in mammalian muscle tissue. Sauvaire and colleagues identified 4OH-Ile as the insulinotropic compound that is largely responsible for the antidiabetic properties of fenugreek seeds; see Sauvaire, et al., *Diabetes* 47, 206 (1998) and U.S. Pat. No. 5,470,879, the disclosures of which are hereby incorporated by reference in their entirety.

Based on in vitro experiments, the researchers reported that 4OH-Ile does not affect the secretion of insulin at normal blood glucose levels, but has strong insulinotropic activity when glucose levels are supranormal. They concluded that 4OH-Ile was a possible candidate for pharmacological treatment of non-insulin-dependent diabetes, owing to 1) the insulinotropic activity of 4OH-Ile; 2) the sensitivity of human $\beta$-cells to 4OH-Ile; and 3) the absence of acute toxicity. The researchers subsequently verified the insulinotropic activity in vivo for normal and diabetic rats, and also concluded that the effect is obtainable by both intravenous and oral delivery; see Broca, et al., *Am. J. Physiol.* 277, E617 (1999). This finding indicates that 4OH-Ile is suitable for supplemental oral delivery.

Antidiabetic compositions comprising 4OH-Ile are reported in PCT Application FR 97/00420 (WO 97/32577) of Sauvaire, et al.

SUMMARY OF THE INVENTION

The present invention provides a dietary supplement for use by a healthy human, comprising 4-hydroxyisoleucine and creatine. Nutraceutically acceptable derivatives may be used in place of 4OH-Ile or creatine. In one embodiment, the present invention provides a dietary supplement for use by a healthy human comprising, per gram of supplement, about 0.5 milligram to about 100 milligrams of 4-hydroxyisoleucine and about 0.02 gram to about 0.80 gram of creatine. In some embodiments of the supplement, free amino acids such as taurine, carnosine, or β-alanine may be included. In other embodiments of the supplement, carbohydrates may be included. The carbohydrate component may include simple sugars such as maltose or dextrose, or complex carbohydrates such as potato starch.

The invention also provides a regimen for supplementing a healthy athlete's diet, comprising administering to the athlete a supplement comprising 4OH-Ile and creatine. Nutraceutically acceptable derivatives may be used in place of 4OH-Ile or creatine. In one embodiment of the regimen, a supplement is administered to the athlete, the supplement comprising about 0.5 milligram to about 100 milligrams of 4OH-Ile or a nutraceutically acceptable derivative, and about 0.02 gram to about 0.80 gram of creatine or a nutraceutically acceptable derivative, per gram of supplement. About 15 grams to about 400 grams of the supplement may be suitably administered to the athlete on a daily basis.

Also provided by the invention is a regimen for supplementing a healthy athlete's diet, comprising administering 4OH-Ile and creatine to the athlete. Nutraceutically acceptable derivatives may be used in place of 4OH-Ile or creatine. In one embodiment of the regimen, about 20 milligrams to about 2 grams of 4OH-Ile or a nutraceutically acceptable derivative, and about 2 grams to about 30 grams of creatine or a nutraceutically acceptable derivative, are administered to the athlete on a daily basis.

DETAILED DESCRIPTION OF THE INVENTION

The present invention provides a dietary supplement for use by a healthy human, comprising 4OH-Ile and creatine. Nutraceutically acceptable derivatives may be used in place of the active ingredients 4OH-Ile and creatine. A combination of an active ingredient and a nutraceutically acceptable derivative, or a combination of more than one nutraceutically acceptable derivative of an active ingredient, may also be used.

The supplements of the present invention are intended for use by healthy humans. The supplements and regimens may not be suitable for humans who suffer from health problems such as diabetes, hypoglycemia, or abnormal insulin sensitivity. Furthermore, the supplements and regimens are not recommended for pregnant or lactating women, nor for youths and adolescents who have not reached maturity.

The term "nutraceutical" has been used to refer to any substance that is a food or a part of a food and provides medical or health benefits, including the prevention and treatment of disease. Hence, compositions falling under the label "nutraceutical" may range from isolated nutrients, dietary supplements and specific diets to genetically engineered designer foods, herbal products, and processed foods such as cereals, soups and beverages. In a more technical sense, the term has been used to refer to a product isolated or purified from foods, and generally sold in medicinal forms not usually associated with food and demonstrated to have a physiological benefit or provide protection against chronic disease.

Since both 4OH-Ile and creatine are naturally occurring in, and can be extracted from, digestible foodstuff, the label "nutraceutical" may be applied to each. As used herein, the phrase "nutraceutically acceptable derivative" is used to refer to a derivative or substitute for the stated chemical species that operates in a similar manner to produce the intended effect, and is structurally similar and physiologically compatible. In the following discussion of the invention, it should be understood that the terms "4-hydroxyisoleucine" or "4OH-Ile," and "creatine" can refer to either the stated chemical species or to a nutraceutically acceptable derivative.

By way of example only, those skilled in the art will recognize that such substitutes could include salts, esters, lactone forms, hydrates, or complexes of the stated chemical. Such substitutes could also include stereoisomers or structural isomers, so long as the substitute operates similarly and produces the desired effect. Alternatively, the substitute could be a precursor to the stated chemical, which subsequently undergoes a reaction in vivo to yield the stated chemical or a substitute thereof.

With reference to 4OH-Ile in particular, it is thought that any nutraceutically acceptable derivative would be required to either include the 4-hydroxy group, or to be derivatized at the 4-hydroxy site in such a manner that the hydroxy group could be regenerated in vivo. In the supplements and regimens of the present invention, 4OH-Ile is thought to enhance the effectiveness of creatine supplementation. The enhancement may be due, in part, to the insulinotropic properties that have been observed for 4OH-Ile. Therefore, a nutraceutically acceptable derivative of 4OH-Ile should also function with similar efficacy to stimulate an increase in blood insulin levels after ingestion.

4OH-Ile is found in very low levels in fenugreek seeds. 4OH-Ile can exist in several stereoisomers, including (2S, 3R, 4S) and (2R, 3R, 4S) conformations. Fenugreek seeds contain a racemic mixture of the (2S, 3R, 4S) and (2R, 3R, 4S) isomers. Broca and colleagues have reported (Broca, et al., *Eur. J. Pharmacol.* 390, 339 (2000)) that the (2S, 3R, 4S) stereoisomer of 4OH-Ile is active as an insulinotropic agent, but that the (2R, 3R, 4S) isomer is inactive. The active (2S, 3R, 4S) form is the major isomer that can be extracted from fenugreek seeds, accounting for 80% of the free amino acid content in the seeds. The (2S, 3R, 4S) and (2R, 3R, 4S) can be extracted from fenugreek seeds in approximately a 90:10 ratio. Broca and colleagues also reported that the lactone form of 4OH-Ile is not active as an insulinotropic agent, and that monomethylated derivatives (γ-hydroxyvalines) are also not active. They further concluded that (2S, 3R, 4S) 4OH-Ile is substantially more (at least 15×) active as an insulinotropic agent than leucine, isoleucine, or homoserine.

It is possible to obtain purified amounts of 4OH-Ile from fenugreek using conventional extraction and purification processes. A method for extracting 4OH-Ile from fenugreek seeds is reported by Sauvaire, et al., *Diabetes* 47, 206 (1998) and in U.S. Pat. No. 5,470,879 to Sauvaire, et al. Methods for extracting 4OH-Ile from fenugreek seeds and separating its stereoisomers are reported by Broca, et al., *Eur. J Pharmacol.* 390, 339 (2000).

Synthetic routes to obtaining various isomers of 4OH-Ile are reported by Kassem, et al., *Acta Cryst.* C56, 1037 (2000) and Rolland, et al., *Acta Cryst.* C57, 1415 (2001), and in PCT Application FR 01/00885 (WO 01/72668 A2) of Ouazani, et al. Wang, et al. (*Eur. J. Org. Chem.* 2002, 834 (2002)) have reported a stereoselective synthesis for obtaining (2S, 3R, 4S) 4OH-Ile that is said to be suitable for large-scale production.

4OH-Ile extractions are also commercially available in various potencies from several sources, including the following: Integrity Nutraceuticals International (Sarasota, Fla.), Fenugreek Extract 50%; Technical Sourcing International (Missoula, Mont.), PROMILIN (Cat. No. T-194) 20% 4OH-Ile; Exotic Naturals (Mumbia, India), Fenugreek Extract 5%; and Auspure Biotechnology Co. Ltd. (Piscataway, N.J.).

Creatine and creatine derivatives are widely available from a number of commercial sources. Commercially available creatine derivatives include creatine phosphate, creatine citrate, magnesium creatine, alkaline creatine, creatine pyruvate, creatine hydrates, and tricreatine malate. Glycocyamine, an in vivo precursor of creatine, is also commercially available and is suitable in the practice of the present invention. For the purposes of this specification, each of these substances is considered to be a nutraceutically acceptable derivative of creatine.

The supplements of the present invention may suitably be provided in powder form. The ingredients, including 4OH-Ile and creatine, are available as powders. The supplements may be made by blending premeasured dry powder ingredients using conventional methods. As some of the ingredients may be hygroscopic, care should be taken to ensure that the powders remain dry and free-flowing.

The supplements may also be provided in other forms, such as a stabilized liquid, consumable gel, snack-type bar, ready-to-drink beverage, or the like. In making supplements for these forms of administration, liquid or solution forms of the ingredients may be suitable. For example, liquid or solution forms of creatine are commercially available, and are suitable for making the supplements of the present invention.

In this specification and in the appended claims, any stated mass quantity refers to the mass of the stated chemical, and not to the mass of the active moiety therein. By way of example, a stated mass for a hydrate of an active ingredient includes the water of hydration; likewise, a stated mass for a salt includes the mass of the counterion. Any stated mass quantity does not include the mass of inactive or inert ingredients, however.

The dietary or food supplements of the present invention comprise a combination or a mixture of 4OH-Ile or a nutraceutically acceptable derivative thereof and creatine or a nutraceutically acceptable derivative thereof. A number of particular embodiments are within the scope of this invention. In one embodiment, the invention provides a dietary supplement for use by a healthy human, comprising, per gram of supplement, about 0.5 milligram to about 100 milligrams of 4OH-Ile, and about 0.02 gram to about 0.80 gram of creatine.

In another embodiment, the supplement contains from about 9 milligrams to about 10 milligrams 4OH-Ile per gram of supplement.

Supplements that include these listed amounts of 4OH-Ile generally provide an augmented amount of this compound that is not provided by ordinary dietary sources of 4OH-Ile, such as fenugreek seeds. The amount of 4OH-Ile that would be recommended for a typical athlete is from about 20 milligrams to about 2 grams per day. Using levels lower than this would probably not yield an efficacious result, while using higher levels could cause negative hypoglycemic effects, or extremely low blood sugar levels.

In another embodiment, the supplement comprises from about 0.15 gram to about 0.17 gram creatine monohydrate per gram of supplement. The amount of creatine that would be used by a typical athlete would be a recommended amount that ranges from about 2 grams to about 30 grams per day.

In one particular embodiment of the supplement, one gram of supplement comprises from about 0.15 gram to about 0.17 gram creatine monohydrate, and from about 9 milligrams to about 10 milligrams 4OH-Ile.

In other embodiments of the supplement, carbohydrates may be included. The carbohydrate component may include simple sugars such as maltose or dextrose, or complex carbohydrates such as potato starch. It is preferred to use carbohydrates, or a mixture of carbohydrates, that provide a high glycemic index in order to cause a rapid increase in the blood glucose level following ingestion of the supplement. In some embodiments, the supplement of the present invention may suitably contain between about 0.5 gram to about 0.8 gram carbohydrates per gram of supplement.

As discussed above, the ingestion of supplementary creatine is often accompanied by ingestion of sugars or other carbohydrates in order to stimulate an insulin response due to an increase in blood glucose. One advantageous feature of the supplement of the present invention is that, by including 4OH-Ile in the supplement, it is possible to reduce the quantity of carbohydrates that is consumed during creatine supplementation. Lowering the quantity of carbohydrates that is ingested is desirable for reducing the number of calories consumed, for reducing the peak blood glucose level experienced, and for maintaining a more stable blood glucose level over time. Reducing the amount of carbohydrates consumed may also help to avoid side effects such as gastrointestinal distress.

It may be desirable to include a non-carbohydrate sweetener in the supplement. Non-carbohydrate sweeteners such as aspartame, sucralose, or acesulfame-K are suitable, as are other known non-caloric sweeteners. A non-carbohydrate sweetener may especially be desirable if little or no sugar is included in the supplement.

In some embodiments of the supplement, free amino acids may be included. Suitable amino acids include taurine, glutamine, carnitine, carnosine, citrulline, leucine, glycine, alanine, β-alanine, and arginine, among others. The benefit of including such amino acid additives will be appreciated by those skilled in the art.

In still further embodiments of this invention, the dietary or food supplement includes other additives such as blood glucose-modifying or blood insulin-modifying agents, or lactate buffering agents. Suitable blood glucose-modifying or blood insulin-modifying agent include chromium, vanadium, Banaba extract, corosolic acid, α-lipoic acid, D-pinitol, panax ginseng, ginseng extract, ginger, ginger extract, cinnamon, cinnamon extract, and methylhydroxy chalcone polymer.

Suitable lactate buffering agents will be recognized by those skilled in the art, and include some of the additives or amino acids listed above. In particular, a suitable lactate buffering agent may be carnosine or β-alanine.

A wide variety of additives or other ingredients may be included in the supplement, as required or as desired. By way of example, the supplement may include vitamins, minerals or electrolytes, acidic or basic components for controlling pH, nutritionally desirable fats, flavor-enhancing or flavor-masking additives, colorants, preservatives, anti-caking agents, etc.

In one embodiment, the supplement is a powder that can be mixed with a fluid to make a beverage. By way of example, the fluid may be a fruit juice or water. For these embodiments, the ingredients of the supplement should be soluble or suspendable in the fluid. Both creatine and 4OH-Ile are soluble or suspendable in water. Generally, other ingredients described above, such as carbohydrates or amino acids, will also be soluble in water to some degree. By way of example, about 62 grams of a supplement described in the following Examples 1 and 2 can be mixed with sufficient water to make a 14- to 16-oz. consumable beverage.

The supplement of the present invention may be consumed at any convenient time to enhance or maintain the quantity of intracellular creatine. However, best results may be obtained by consuming the product immediately after a period of exercise.

For optimum benefit, the supplement should be consumed with carbohydrates. As described above, the supplement may include a carbohydrate component, which would provide the desired quantity of carbohydrates. The supplement does not need to contain carbohydrates, however, as sufficient carbohydrates may be available from other dietary sources such as fruit juices or other nutritional supplements that are consumed before, during or after consumption of the supplement of the present invention.

The invention also provides a regimen for supplementing a healthy athlete's diet, comprising administering to the athlete a supplement comprising 4OH-Ile and creatine. Nutraceutically acceptable derivatives may be used in place of 4OH-Ile or creatine. In one embodiment of the regimen, a supplement is administered to the athlete, the supplement comprising about 0.5 milligram to about 100 milligrams of 4OH-Ile or a nutraceutically acceptable derivative, and about 0.02 gram to about 0.80 gram of creatine or a nutraceutically acceptable derivative, per gram of supplement. In another embodiment, about 15 grams to about 400 grams of the supplement may be suitably administered to the athlete on a daily basis. A feature of this regimen includes enhancement of an athlete's muscle size and strength by administration to an athlete a supplement comprising 4OH-Ile or a nutraceutically acceptable derivative thereof, and creatine or a nutraceutically acceptable derivative thereof.

Also provided by the invention is a regimen for supplementing a healthy athlete's diet, comprising administering 4OH-Ile and creatine to the athlete. Nutraceutically acceptable derivatives may be used in place of 4OH-Ile or creatine.

In the practice of the regimen, it is preferred that 4OH-Ile be administered in a form other than in a natural food source; i.e., 4OH-Ile is administered via a concentrated extract or a synthesized form, and not by supplementary fenugreek seeds. However, 4OH-Ile may be administered as a fenugreek extract, if the extract is sufficiently concentrated to provide a significant quantity of 4OH-Ile.

The regimens of the invention are intended to alter or modify the body's utilization of nutrients using the combination of 4OH-Ile and creatine, or nutraceutically acceptable derivatives thereof. The use of a combination of creatine and 4OH-Ile is intended to increase serum insulin levels and to potentiate greater creatine transport.

Those skilled in the art understand that glycogen and amino acid storage are key regulators of protein synthesis in the cell. Also, greater glycogen storage capacity typically leads to greater muscle endurance, thus allowing extended work-out periods and enhanced physical performance. In addition, delivering additional amino acids potentially enhances protein synthesis within the cell, thereby increasing muscle mass and performance or strength.

The reported research data discussed above shows that 4OH-Ile can significantly alter and improve the body's utilization of nutrients that are transported by insulin-dependent or insulin-mediated pathways. It is thought that creatine transport is mediated through the insulin pathways due to the response seen after the ingestion of carbohydrates, specifically glucose. Since 4OH-Ile has a direct effect on potentiating the release of insulin through the beta cells of the pancreas, and since the effect is blood glucose-dependent, the use of 4OH-Ile in combination with an insulin-potentiating sugar or other compound could reduce the glucose level and impact creatine transport into the muscle cell. In addition, 4OH-Ile may permit the delivery of nutrients (such as carbohydrates, proteins or other non-macro nutrients) to human cells faster and in greater quantities than would naturally occur physiologically following a period of exercise (when glucose distribution is shifted preferentially to deliver to muscle tissue rather than adipose tissue).

In one embodiment of the regimen, about 20 milligrams to about 2 grams of 4OH-Ile or a nutraceutically acceptable derivative, and about 2 grams to about 30 grams of creatine or a nutraceutically acceptable derivative, are administered to the athlete on a daily basis.

In another embodiment of this regimen, an athlete is administered about 550 to about 650 milligrams 4OH-Ile per day. In another embodiment, the athlete is administered about 9 to about 11 grams creatine per day.

In yet another embodiment, between 1 milligram per kilogram (mg/kg) body weight to 30 mg/kg body weight of 4OH-Ile is administered to the athlete daily. In another embodiment, up to about 50 mg/kg is taken daily. The amount of 4OH-Ile that would be used by a typical athlete is from about 20 milligrams to about 2 grams per day. Using levels lower than this would probably not yield an efficacious result, while using higher levels could cause negative hypoglycemic effects, or extremely low blood sugar levels.

The present invention also provides methods for altering or modifying the body's utilization of nutrients by administering 4OH-Ile or a nutraceutically acceptable derivative. Such methods include using supplementary 4OH-Ile to facilitate greater overall nutrient transport. The nutrients for which this method is particularly applicable include carbohydrates, proteins, amino acids, creatine, herbal supplements, or other nutrients or nutraceuticals which may be provided by known dietary supplements.

The invention thus includes a method for enhancing the body's absorption and utilization of a nutrient, comprising administering 4-hydroxyisoleucine or a nutraceutically acceptable derivative thereof in combination with the nutrient. In one embodiment, about 20 milligrams to about 2 grams of 4-hydroxyisoleucine or nutraceutically acceptable derivative, is administered on a daily basis. In the practice of the methods, it is intended that 4OH-Ile be administered in a form other than in a natural food source; i.e., 4OH-Ile is administered via a concentrated extract or a synthesized form, and not by supplementary fenugreek seeds.

In one embodiment, the nutrient is an amino acid selected from the group consisting of leucine, isoleucine, valine, carnosine, β-alanine, glutamine, taurine, arginine, alanine, glycine, citrulline. In another embodiment, the nutrient is a dipeptide, tripeptide, polypeptide, or protein. The nutrient may also be an herbal supplement, or a synthetically derived nutraceutical.

EXAMPLES

Example 1

A powder-form nutritional supplement, suitable for mixing with water to provide a beverage, was made according to the formulation given in Table 1 by dry-mixing the listed ingredients.

TABLE 1

Formulation for one serving of a nutritional supplement.

| Ingredient | Quantity (g) | Wt.-% |
|---|---|---|
| Creatine monohydrate | 10.0 | 16.13 |
| Fenugreek extract (standardized 50% 4-hydroxyisoleucine) | 1.2 | 1.94 |
| Carbohydrates (25.6 parts dextrose, 1 part maltose, 1 part potato starch, by weight) | 38.37 | 61.89 |
| Taurine | 1.0 | 1.61 |
| Phosphates (tricalcium phosphate, disodium phosphate) | 1.6 | 2.58 |
| Citric acid | 1.4 | 2.26 |
| Flavorings | 7.34 | 11.84 |
| Silicon dioxide | 0.93 | 1.50 |
| Artificial sweetener | 0.12 | 0.19 |
| Coloring | 0.04 | 0.06 |

The formulation is based on a serving size of 62 grams. A fruit punch-flavored beverage may be made by measuring 62 grams of the supplement, and mixing with sufficient water to make about 14 to 16 fluid ounces. The beverage may then be consumed following a workout.

The supplement provides 0.6 grams 4OH-Ile per serving (about 9.7 milligrams per gram of supplement), and about 10 grams creatine per serving (about 0.16 gram per gram of supplement).

Example 2

A powder-form nutritional supplement, suitable for mixing with water to provide a beverage, was made according to the formulation given in Table 2 by dry-mixing the listed ingredients.

TABLE 2

Formulation for one serving of a nutritional supplement.

| Ingredient | Quantity (g) | Wt.-% |
|---|---|---|
| Creatine monohydrate | 10.0 | 16.12 |
| Fenugreek extract (standardized 50% 4-hydroxyisoleucine) | 1.2 | 1.93 |
| Carbohydrates (24.8 parts dextrose, 1 part maltose, 1 part potato starch, by weight) | 40.25 | 64.88 |
| Taurine | 1.0 | 1.61 |
| Phosphates (tricalcium phosphate, disodium phosphate) | 1.6 | 2.58 |
| Citric acid | 1.4 | 2.26 |
| Flavorings | 5.49 | 8.85 |
| Silicon dioxide | 0.93 | 1.50 |
| Artificial sweetener | 0.12 | 0.19 |
| Colorings | 0.043 | 0.07 |

The formulation is based on a serving size of 62 grams. A black cherry-flavored beverage may be made by measuring 62 grams of the supplement, and mixing with sufficient water to make about 14 to 16 fluid ounces. The beverage may then be consumed following a workout.

The supplement provides 0.6 grams 4OH-Ile per serving (about 9.7 milligrams per gram of supplement), and about 10 grams creatine per serving (about 0.16 gram per gram of supplement).

This invention may take on various modifications and alterations without departing from the spirit and scope thereof. Accordingly, it is to be understood that this invention is not to be limited to the above-described, but it is to be controlled by the limitations set forth in the following claims and any equivalents thereof. It is also to be understood that this invention may be suitably practiced in the absence of any element not specifically disclosed herein.

In describing preferred embodiments of the invention, specific terminology is used for the sake of clarity. The invention, however, is not intended to be limited to the specific terms so selected, and it is to be understood that each term so selected includes all technical equivalents that operate similarly.

What is claimed is:

1. A dietary supplement for use by a healthy human, comprising, per gram of supplement:
   about 0.5 milligram to about 100 milligrams of 4-hydroxyisoleucine, a nutraceutically acceptable derivative, or a combination thereof; and
   about 0.02 gram to about 0.80 gram of creatine, a nutraceutically acceptable derivative, or a combination thereof.

2. The dietary supplement of claim 1, comprising about 0.5 milligram to about 100 milligrams of 4-hydroxyisoleucine per gram of supplement.

3. The dietary supplement of claim 1, comprising about 0.5 milligram to about 100 milligrams of (2S, 3R, 4S) 4-hydroxyisoleucine per gram of supplement.

4. The dietary supplement of claim 1, comprising about 9 milligrams to about 10 milligrams 4-hydroxyisoleucine per gram of supplement.

5. The dietary supplement of claim 1, comprising, per gram of supplement, about 0.02 gram to about 0.80 gram creatine phosphate, creatine citrate, magnesium creatine, alkaline creatine, creatine pyruvate, creatine hydrates, tricreatine malate, glycocyamine, or a combination thereof.

6. The dietary supplement of claim 1, comprising about 0.02 gram to about 0.80 gram creatine monohydrate per gram of supplement.

7. The dietary supplement of claim 1, comprising about 0.15 gram to about 0.17 gram creatine monohydrate per gram of supplement.

8. The dietary supplement of claim 1, comprising, per gram of supplement:
   about 9 to about 10 milligrams 4-hydroxyisoleucine; and
   about 0.15 to about 0.17 gram creatine monohydrate.

9. The dietary supplement of claim 1, and further comprising about 1 milligram to about 160 milligrams free amino acids per gram of supplement.

10. The dietary supplement of claim 9, wherein the free amino acids include taurine, glutamine, carnitine, carnosine, citrulline, leucine, glycine, alanine, β-alanine, arginine, or a combination thereof.

11. The dietary supplement of claim 1, and further comprising about 15 milligrams to about 17 milligrams taurine per gram of supplement.

12. The dietary supplement of claim 1, and further comprising about 0.5 gram to about 0.8 gram carbohydrates per gram of supplement.

13. The dietary supplement of claim 12, wherein the carbohydrates include simple sugars.

14. The dietary supplement of claim 13, wherein the simple sugars include maltose, dextrose, or a combination thereof.

15. The dietary supplement of claim 12, wherein the carbohydrates include complex carbohydrates.

16. The dietary supplement of claim 15, wherein the complex carbohydrates include potato starch.

17. The dietary supplement of claim 1, and further comprising a blood glucose-modifying or blood insulin-modifying agent.

18. The dietary supplement of claim 17, wherein the blood glucose-modifying or blood insulin-modifying agent is selected from the group consisting of chromium, vanadium, Banaba extract, corosolic acid, α-lipoic acid, D-pinitol, panax ginseng, ginseng extract, ginger, ginger extract, cinnamon, cinnamon extract, and methylhydroxy chalcone polymer.

19. The dietary supplement of claim 1, further comprising a lactate buffering agent selected from the group consisting of carnosine and β-alanine.

20. The dietary supplement of claim 1, wherein the supplement is a powder that can be mixed with a fluid to make a beverage.

21. The dietary supplement of claim 20, wherein the fluid is water.

22. A regimen for supplementing a healthy athlete's diet, comprising administering to the athlete a supplement comprising, per gram of supplement:
 about 0.5 milligram to about 100 milligrams of 4-hydroxyisoleucine, a nutraceutically acceptable derivative, or a combination thereof; and
 about 0.02 gram to about 0.80 gram of creatine, a nutraceutically acceptable derivative, or a combination thereof.

23. The regimen of claim 22, wherein about 15 grams to about 400 grams of the supplement are administered to the athlete on a daily basis.

24. A regimen for supplementing a healthy athlete's diet, comprising administering to the athlete, on a daily basis:
 about 20 milligrams to about 2 grams of 4-hydroxyisoleucine, a nutraceutically acceptable derivative, or a combination thereof; and
 about 2 grams to about 30 grams of creatine, a nutraceutically acceptable derivative, or a combination thereof.

25. The regimen of claim 24, wherein about 550 to about 650 milligrams of 4-hydroxyisoleucine is administered to the athlete on a daily basis.

26. The regimen of claim 24, wherein about 9 grams to about 11 grams of creatine monohydrate is administered to the athlete on a daily basis.

27. The regimen of claim 24, wherein not more than 50 milligrams 4-hydroxyisoleucine per kilogram of the athlete's body weight is administered to the athlete on a daily basis.

28. The regimen of claim 24, wherein about 1 milligram to about 30 milligrams 4-hydroxyisoleucine per kilogram of the athlete's body weight is administered to the athlete on a daily basis.

* * * * *